Feb. 23, 1960
G. A. LYON
2,926,043
WHEEL COVER
Filed Dec. 6, 1954
2 Sheets-Sheet 2
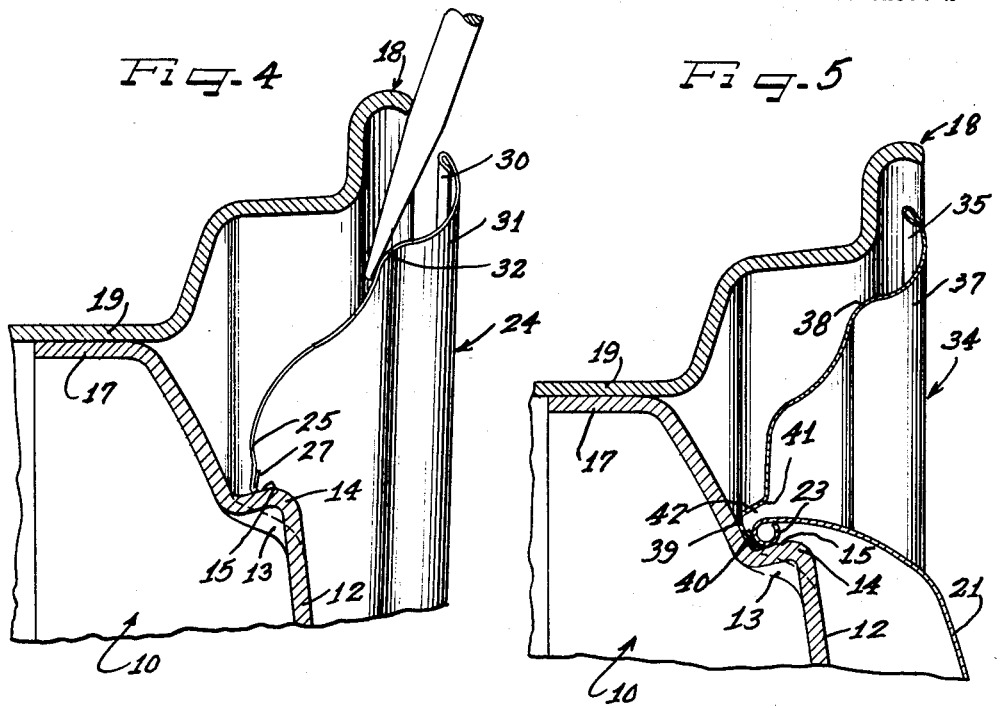
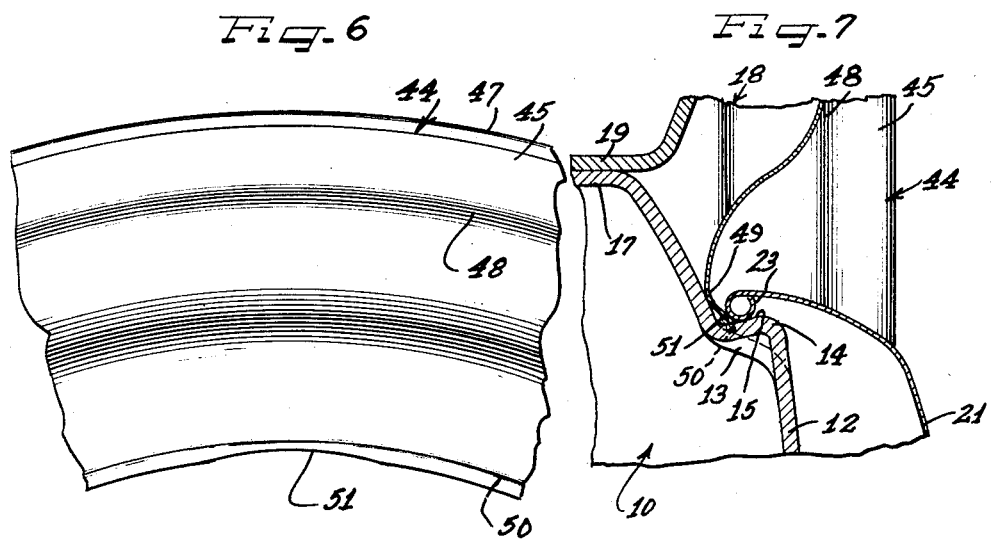
Inventor
GEORGE ALBERT LYON
by *[signature]* Attys.

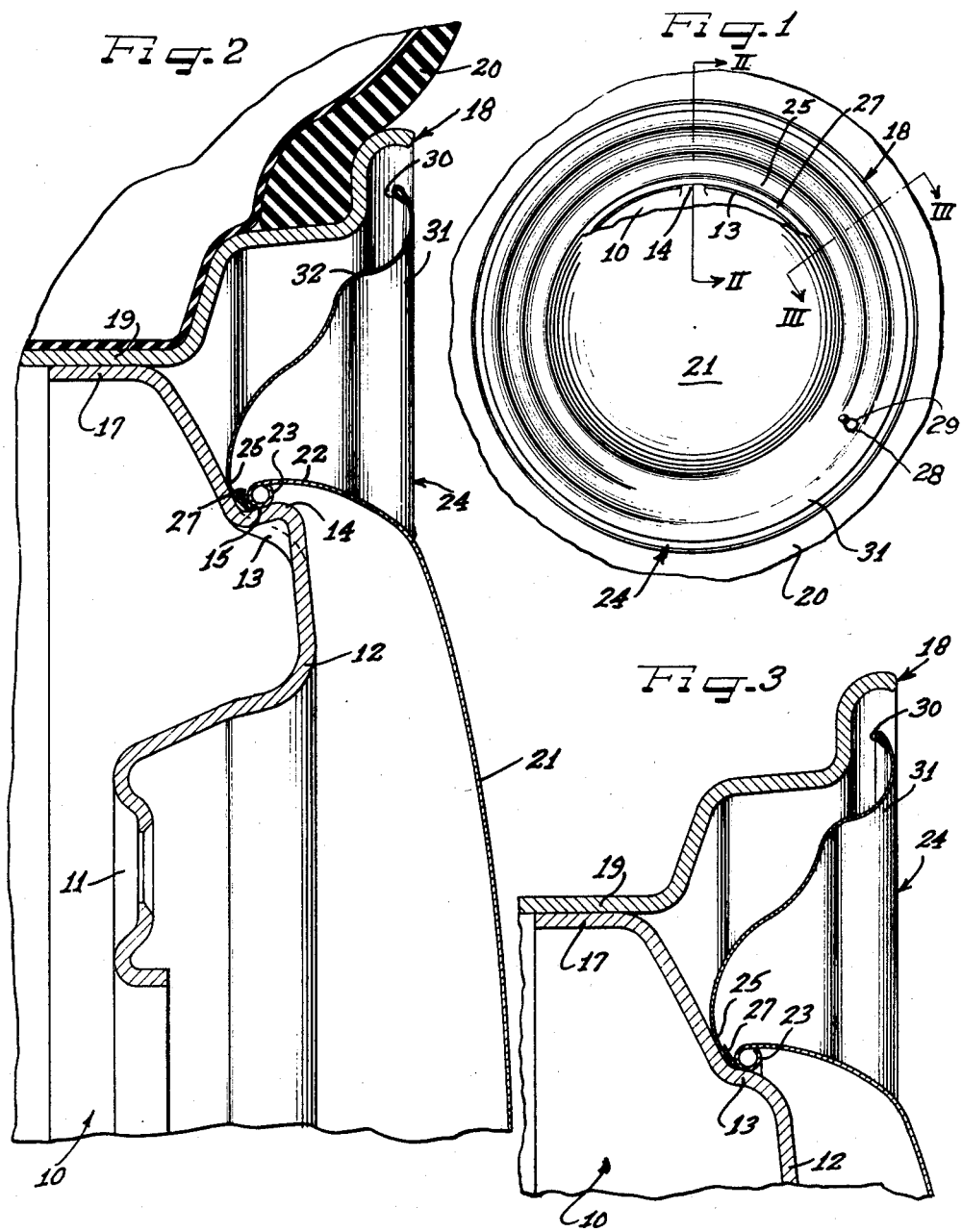

United States Patent Office 2,926,043
Patented Feb. 23, 1960

2,926,043

WHEEL COVER

George Albert Lyon, Detroit, Mich.

Application December 6, 1954, Serial No. 473,203

6 Claims. (Cl. 301—37)

The present invention relates to improvements in wheel structures and more particularly concerns the ornamental and protective covering of the outer sides of vehicle wheels.

An important object of the present invention is to provide an improved wheel structure having a novel cover assembly including a trim ring and hub cap combination.

Another object of the invention is to provide an improved wheel cover assembly including a trim ring and a hub cap engageable with retaining bumps on a wheel.

A further object of the invention is to provide a wheel cover structure having improved means for retaining engagement with retaining bumps on a wheel.

Still another object of the invention is to provide improved means in a wheel cover for retaining snap-on pry-off relation with retaining bumps on a wheel.

Other objects, features and advantages of the present invention will be readily apparent from the following detailed description of certain preferred embodiments thereof taken in conjunction with the accompanying drawings, in which:

Figure 1 is an outer side elevational view of a vehicle wheel structure embodying features of the invention, with a portion broken away for clarity of illustration.

Figure 2 is an enlarged fragmentary radial sectional view taken substantially on the line II—II of Fig. 1.

Figure 3 is a fragmentary radial sectional detail view taken substantially on the line III—III of Fig. 1.

Figure 4 is a fragmentary radial sectional view substantially like Fig. 2 but showing the trim ring in process of being pried from the wheel.

Figure 5 is a radial sectional view similar to Fig. 2 but showing a modification.

Figure 6 is a fragmentary radial sectional view similar to Figs. 2 and 5 but showing a further modification; and Figure 7 is a fragmentary rear elevational view of the trim ring of Fig. 6.

Having reference first to the from of the invention shown in Figs. 1–4, a wheel is shown embodying the principles of the invention covered in my Patent No. 2,445,330, issued July 20, 1948. To this end, the wheel comprises a wheel body 10 of the stamped heavy gauge sheet metal disk spider type having a dished central bolt-on flange 11, an annular intermediate axially outwardly projecting nose bulge 12 provided at its radially outer side with a generally radially outwardly facing annular shoulder 13 provided with radially outwardly facing cover retaining bumps 14 having generally undercut-like radially and axially outwardly facing retaining shoulders 15 offset radially outwardly from the shoulder 13. Radially outwardly beyond the shoulder 13, the cover body extends generally radially outwardly and axially inwardly and terminates in a generally axially inwardly directed outer marginal attachment flange 17.

Carried by the wheel body 10 is a tire rim 18 having a base flange 19 suitably attached to the body marginal flange 17. The tire rim is of the multi-flange, drop center type for supporting a pneumatic tire and tube assembly 20 or a tubeless tire, as preferred.

A hub cap 21 of a diameter to overlie the bolt-on flange 11 and the nose bulge 12 of the wheel body has a flange 22 provided with a resilient inturned bead ex-resilient generally axially inwardly directed marginal tremity 23 of an inside diameter slightly less than the diameter described about the retaining bump shoulders 15 so that when the hub cap 21 is pressed home onto the wheel over the bumps 14, the retaining bead 23 will be stretched at the bumps 14, which may be of three in number, and the intermediate portions of the bead 23 between the bumps will be drawn toward the wheel body and the shoulder 13 as seen in Fig. 3.

By the present invention there is provided a cover member or trim, herein in the form of a trim ring 24 which is preferably made from suitable resilient sheet metal such as stainless steel or brass or aluminum alloy, or the like and constructed and arranged for snap-on pry-off engagement with the retaining bumps 14. To this end, the cover member 24 is formed as an annulus which at its inner margin is provided with an annular resilient preferably inwardly dished marginal flange 25 for bottoming against the wheel body 10 radially outwardly adjacent to the shoulder 13. At its inner extremity the inner marginal flange 25 is turned upon itself to provide a flattened reinforcing flange extremity 27. This also increases the resiliency of the inner edge extremity of the cover member.

The normal inside diameter described by the reinforced edge of the flange structure 25, 27 is preferably approximately the same or just clear of the largest diameter of the wheel body shoulder 13. Hence, retention of the trim member 24 on the wheel is readily effected by pressing the inner margin into retaining engagement with the retaining bumps 14. In doing so, a valve stem aperture 28 in the cover member is registered with a valve stem 29 that will thus project therethrough, and the reinforced inner edge of the trim member pressed axially inwardly over the retaining bumps 14. This causes the reinforced inner extremity 27 of the cover member to be resiliently deflected generally radially and axially outwardly relative to the remainder of the trim member edge to clear the maximum projection or nose portions of the retaining bumps 14 as the margin of the trim member cams thereover. Then, as the resiliently stretched or deflected portions of the turned edge 27 in engagement with the bumps cam inwardly under resilient tension against the shoulders 15 of the bumps, the cover member is drawn axially inwardly until the marginal flange 25 bottoms against the wheel body, as seen in Fig. 2. Such bottoming of the flange 25 is maintained under resilient tension by virtue of the at least partial resiliently deflected, radially upwardly stretched condition under which the bump-engaging portions of the cover edge are maintained in the final assembly, as will be readily apparent on comparison of Figs. 2 and 3. The intermediate portions of the flange 25 inclusive of the reinforced turned extremity 27 will lie substantially flush against the wheel body adjacent the body shoulder 13.

Since the reinforcing terminal 27 of the ring cover member is flattened to provide a double thickness, and the portions of the cover edge in engagement with the retaining bumps 14 is maintained under only slightly deflected condition at engagement with the retaining bumps, ample extent or clearance is afforded on the retaining bump shoulders 15 for thorough gripping tensioned engagement of the retaining bead 23 of the hub cap therewith. It will be observed that the retaining bead 23 presses against the turned reinforcing flange 27 of the trim member and thus further assists in holding the trim member on the wheel.

From the inner marginal bottoming flange 25, the trim member 24 extends generally radially and axially outwardly into overlying spaced relation to the tire rim with the radially outer extremity of the trim member overlying the terminal flange of the tire rim and turned under to provide a reinforcing and finishing bead 30. Immediately adjacent the turned edge bead 30, the trim ring member is provided with an annular convexly shaped reinforicng marginal rib 31, while an inwardly dished or concave annular pry-off reinforcing rib 32 is provided immediately radially inwardly adjacent the outer rib 31. By having the trim member 24 entirely free and in spaced relation to the tire rim, weaving flexures of the tire rim in service operation have no effect upon the trim member. Moreover, the trim member is independent of any manufacturing tolerance variations in the relative axial assembled disposition of the wheel body and the tire rim.

For removing the trim member 24 from the wheel, the hub cap 21 is first pried free from the retaining bumps 14 by insertion of a pry-off tool such as a screw driver between the bead 23 of the hub cap and the turned reinforcing marginal extremity flange 27 of the trim ring. Pry-off leverage is then exerted to dislodge the hub cap 21. Thereafter, pry-off leverage is exterted against the trim ring 24, substantially as shown in Fig. 4, as by means of a pry-off tool P levered against the edge of the tire rim and against the reinforced edge bead 30 of the trim ring and then against the pry-off rib 32. Pry-off force thus exerted against the trim ring causes the inner marginal flange 25 to resiliently buckle and turn on itself so that the reinforced extremity 27 fulcrums on the adjacent retaining bump shoulder 15 and turns from a generally radially inwardly and axially outwardly slanting oblique position as shown in Fig. 2, into a generally radially and axially inwardly tilted direction as shown in Fig. 4 so that by continued pry-off force the reinforced inner edge will slide off of the retaining bump and thus dislodge the trim ring from the wheel. Thereupon the inner marginal retaining flange 25 snaps back to the original position, that is into the generally dished and generally radially inwardly and axially outwardly angular relationship as more particularly shown in Fig. 3, so that reapplication of the trim ring to the wheel is facilitated.

In the modification of Fig. 5, details of the wheel body and tire rim are identical to those shown in Fig. 2 and therefore identical reference numerals identify similar parts. The hub cap is also of the same construction and is thus similarly identified as in Fig. 2. In this form of the invention, a modified trim member 34 is provided which is dimensioned to overlie the tire rim 18 in spaced relation and has an underturned outer marginal reinforcing and finishing bead 35, with an outer marginal rib-like convexly shaped annular marginal portion 37 with an indented annular pry-off rib 38 radially inwardly therefrom.

At its inner margin the trim member 34 is provided with a stiffly resilient inner marginal flange 39 adapted to bottom against the wheel body 10 radially outwardly adjacent the wheel body shoulder 13. An outturned and squeeze-down annular marginal reinforcing flange extremity 40 and the contiguous underlying portion of the flange 39 are preferably concavely shaped transversely in order to receive the retaining bead 23 of the hub cap 21 snugly therein in nested relation to thereby reduce the space occupied behind the bead 23 by the reinforced trim ring margin to the barest minimum.

Radially outwardly adjacent to the edge of the hub cap, the trim ring is provided with an annular generally axially outwardly bulged pry-off rib 41 affording with the adjacent edge of the hub cap a pry-off tool gap 42 into which the tip of a pry-off tool can be inserted for prying the hub cap from the wheel, with the tool levering against the pry-off rib or shoulder 41.

By virtue of the pry-off rib shoulder 41, the inner margin of the trim ring 34 is substantially stiffened and the bump-engaging flange margin 39 is fairly narrow and thus, with the reinforcement provided by the turned-back reinforcing flange extremity 40 is fairly stiffly resilient. Accordingly, the inside diameter defined by the edge of the flange 39 is only slightly smaller than the minimum diameter defined about the bump shoulders 15.

In applying the trim ring 34 to the wheel, the retaining flange 39 is generally engaged behind two of the retaining bumps 14 by maneuvering the same into position, and then the flange is snapped over the remaining retaining bump 14, assuming of course that there are three of the retaining bumps. The snap-on is facilitated by the generally inwardly dished, curved formation of the flange 39 which facilitates camming of the same over the retaining bump.

Removal of the trim ring 34 is effected substantially the same as removal of the trim ring 24 as shown in Fig. 4. That is, a pry-off tool is applied behind the trim ring and the same is pried free from the adjacent retaining bump 14, after the hub cap 21 has, of course, been removed.

In the modification of Figs. 6 and 7, the wheel body and tire rim are of the same structure as in Figs. 2 and 5 and accordingly the same reference numerals have been applied to identical parts thereof. In this form of the invention, a trim cover member 44 is provided which in general respects may be substantially the same as the trim member 24, having a diameter to overlie the tire rim 18 in spaced relation, with an outer marginal rib-like annular portion 45 having an underturned reinforcing and finishing bead extremity 47. Radially inwardly of the outer marginal rib 45 is an indented annular pry-off rib 48.

At its inner margin the trim member 44 is dished inwardly and has an annular marginal resilient flange portion 49 which is arranged to bottom against the wheel body 12 radially outwardly from the retaining bumps 14. A generally radially inwardly and axially outwardly oblique flange extremity portion 50 of the bottoming marginal flange 49 is of a general diameter to fit easily about the wheel body shoulder 13, with appropriate portions of the flange extremity 50 at proper intervals turned up out of the general plane of the flange 50 to provide bump engaging portions 51. These bump engaging portions are arched in circumferential direction as best seen in Fig. 7 and provide retaining sections affording easy-on hard-off retaining engagement with the bumps 14.

In applying the trim ring 44 to the wheel, the bump engaging flange portions or sections 51 are aligned with the bumps and while two or more of the sections 51 may be slid in under the retaining shoulders 15 of the bumps, the remaining bump engaging section 51 is then pressed axially inwardly to cam over the nose of the bump and then snapped in behind the retaining shoulder 15 of the bump. In so doing, the flexed retaining section 51 engages in more or less biting tensioned gripping relation against the bump shoulder 15, and all of the edges provided by the bump engaging sections 15 thus cooperate with the retaining bumps to retain the trim ring firmly against the wheel with the flange 49 bottoming against the wheel body.

Pry-off of the trim ring 44 is effected similarly as shown in Fig. 4. During such pry-off, the retaining sections 51 buckle and turn upon themselves resiliently to disengage from the retaining bumps in response to the pry-off tool leverage force.

In all forms of the invention the retaining flange inner marginal extremity of the trim member engages in tensioned edgewise engagement with the retaining bumps and the portions of the retaining flange directly in engagement with the bumps are resiliently deflected to an extent not only assuring firm gripping of the retaining bumps, but also retaining the trim member against turning on the wheel by the cooperative relationship of the portions of the trim inner marginal flange or edge intermediate the bumps with the sides of the bumps.

It will be understood that modifications and variations may be effected without departing from the scope of the novel concepts of the present invention.

I claim as my invention:

1. In a wheel structure including a wheel body having retaining bumps thereon with overhanging generally axially inwardly and radially outwardly facing retaining shoulders thereon and a portion of the wheel generally radially outwardly from the bumps facing generally axially outwardly, and a trim member for disposition at the outer side of the wheel for covering said radially outer portion of the wheel body and projecting substantially therebeyond, said trim member having an inner margin provided with generally radially inwardly and axially outwardly extending flange portions thereof normally extending to a diameter that is smaller than the diameter described about said bump shoulders and engageable retainingly with said bump shoulders under resilient radially outward deflection thrusting cammingly against the shoulders and thereby urging said trim member margin toward the axially facing portion of the wheel body, said trim member margin having a portion disposed radially outwardly and axially inwardly adjacent to but spaced from said flange portions and thrustingly engageable in bottomed relation against said axially facing body portion and thereby maintaining said flange portions under resilient tension against said shoulder.

2. In a wheel structure including a wheel body having retaining bumps thereon with overhanging generally axially inwardly and radially outwardly facing retaining shoulders thereon and a portion of the wheel generally radially outwardly from the bumps facing generally axially outwardly, and a trim member for disposition at the outer side of the wheel for covering said radially outer portion of the wheel body and projecting substantially therebeyond, said trim member having an inner margin provided with generally radially inwardly and axially outwardly extending flange portions thereof normally extending to a diameter that is smaller than the diameter described about said bump shoulders and engageable retainingly with said bump shoulders under resilient radially outward deflection thrusting cammingly against the shoulders and thereby urging said trim member margin toward the axially facing portion of the wheel body, said trim member margin having a portion disposed radially outwardly and axially inwardly adjacent to but spaced from said flange portions and thrustingly engageable in bottomed relation against said axially facing body portion and thereby maintaining said flange portions under resilient tension against said shoulder, and a hub cap having a turned extremity retainingly resiliently grippingly engageable with said retaining bump shoulders and cammingly reacting thereagainst to press generally axially inwardly against said bump engaging flange portions of the trim member margin to enhance the retaining grip thereof on the bump shoulders and also to enhance the axially inward bottoming pressure of the trim margin bottoming portion against said axially facing portion of the wheel body.

3. In a wheel structure including a wheel body having retaining bumps thereon with overhanging generally axially inwardly and radially outwardly facing retaining shoulders thereon and a portion of the wheel generally radially outwardly from the bumps facing generally axially outwardly, and a trim member for disposition at the outer side of the wheel for covering said radially outer portion of the wheel body and projecting substantially therebeyond, said trim member having an inner margin provided with generally radially inwardly and axially outwardly extending flange portions thereof normally extending to a diameter that is smaller than the diameter described about said bump shoulders and engageable retainingly with said bump shoulders under resilient radially outward deflection thrusting cammingly against the shoulders and thereby urging said trim member margin toward the axially facing portion of the wheel body, said trim member margin having a portion disposed radially outwardly and axially inwardly adjacent to but spaced from said flange portions and thrustingly engageable in bottomed relation against said axially facing body portion and thereby maintaining said flange portions under resilient tension against said shoulder, said bump engaging flange portions of the trim margin being resiliently flexibly turnable upon themselves upon the application of pry-off force to the trim for thereby enabling sliding free of said bump engaging marginal flange portions of the trim member in response to continuation of the pry-off force.

4. In a wheel structure including an annular generally radially facing portion having a circumferentially spaced series of cover retaining bumps projecting therefrom and provided with generally axially inwardly and radially facing retaining shoulders, a circular cover member for disposition at the outer side of the wheel having a marginal retaining flange structure engageable under resilient retaining tension with said retaining bump shoulders, the portions of said flange structure in engagement with the bump shoulders being offset from the portions circumferentially adjacent thereto and disposed at the opposite sides of the respective bumps, said circumferentially adjacent portions being engageable with the sides of the bump to hold the cover against turning on the wheel.

5. In a wheel structure including a circular portion having generally radially extending circumferentially spaced cover retaining rigid bumps with generally axially inwardly and radially facing retaining shoulders, a circular cover member having a marginal continuous circular flange extending generally axially outwardly and radially and having an annular continuous extremity portion thereof turned upon itself and flattened down to minimum double thickness and providing at the juncture a cover retaining edge projecting generally axially outwardly and radially and engageable under resilient tensioned thrust with said bump shoulders, and a second circular cover member having a resiliently flexible edge portion retainingly grippingly and cammingly engaging said bump shoulders and under resilient tension cammed thereby thrustingly against the bump engaging edge of said first mentioned circular cover member.

6. A wheel structure as defined in claim 1, wherein said trim member flange portions are part of a continuous annular flange having a reinforcing extremity flange turned over and flattened against its axially outer side.

References Cited in the file of this patent

UNITED STATES PATENTS

| | | |
|---|---|---|
| 2,263,243 | Lyon | Nov. 18, 1941 |
| 2,445,330 | Lyon | July 20, 1948 |
| 2,544,701 | Lyon | Mar. 13, 1951 |
| 2,544,703 | Lyon | Mar. 13, 1951 |
| 2,650,134 | Lyon | Aug. 25, 1953 |